United States Patent [19]

Daniels

[11] 3,760,676
[45] Sept. 25, 1973

[54] UNITIZED RAM DRIVE FOR A PUNCH PRESS

[75] Inventor: Dennis Daniels, Bellevue, Wash.

[73] Assignee: U.S. Amada, Ltd., Seattle, Wash.

[22] Filed: May 5, 1972

[21] Appl. No.: 250,780

[52] U.S. Cl.......................... 83/590, 30/228, 74/57, 83/628, 83/916
[51] Int. Cl............................................ B23d 27/00
[58] Field of Search...................... 83/590, 628, 916; 30/228, 372, 372 A; 74/56, 57

[56] References Cited
UNITED STATES PATENTS

| | | | |
|---|---|---|---|
| 1,367,827 | 2/1921 | Noble | 74/57 |
| 2,009,580 | 7/1935 | Govanus | 74/56 X |
| 2,211,741 | 8/1940 | Elwell | 74/56 |
| 3,403,668 | 10/1968 | Schottler | 74/56 X |

Primary Examiner—J. M. Meister
Attorney—Richard W. Seed et al.

[57] ABSTRACT

A punch drive converts rotary motion from a power source in one embodiment into one-speed reciprocation or in another embodiment into selective two-speed reciprocation of a punch. In the latter embodiment the slower speed of reciprocation is provided by rolling a plurality of primary thrust balls between a rotating gear and a reciprocating primary wave thrust ring. The wave thrust ring has three cam waves which cause the thrust ring to be reciprocated downwardly as the balls roll thereover. The thrust ring is coupled through a clutch mechanism to the punch. The second speed is provided by a rotatable nibbling drive collar and a reciprocating nibbling wave thrust ring having a plurality of nibbling thrust balls therebetween. The nibbling wave thrust ring is provided with nine cam waves which cause reciprocation of the nibbling wave thrust ring as the thrust balls are rolled thereover. The nibbling wave thrust ring is also coupled to the punch. The rate of downward movement of the thrust rings is determined by the slope angles of the forward surfaces of the cam waves.

12 Claims, 17 Drawing Figures

STANDARD PUNCH
UP POSITION

STANDARD PUNCH
UP POSITION

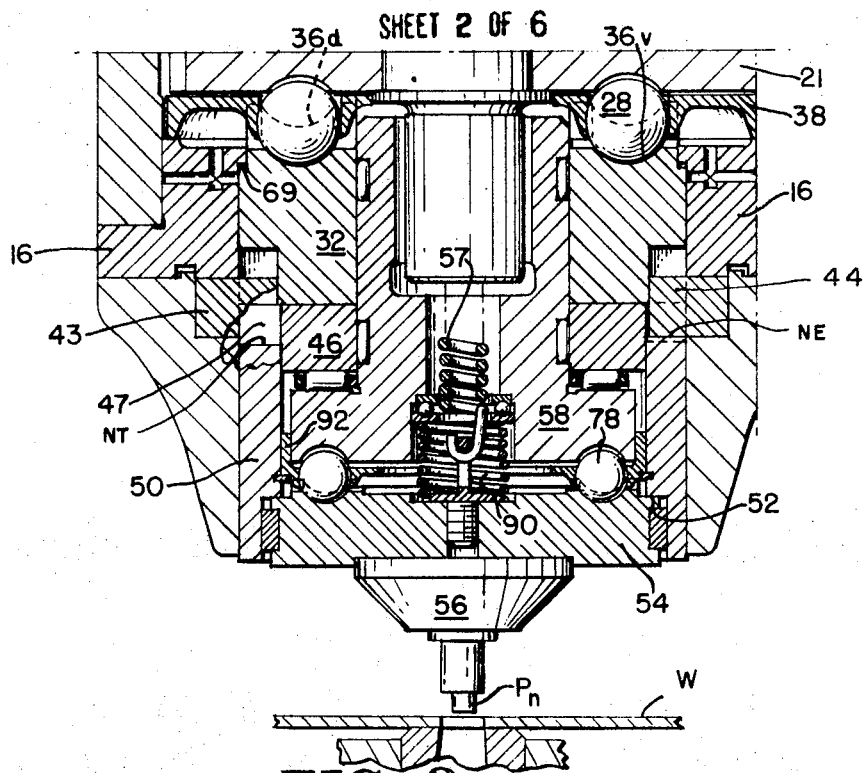
FIG. 3 NEUTRAL POSITION
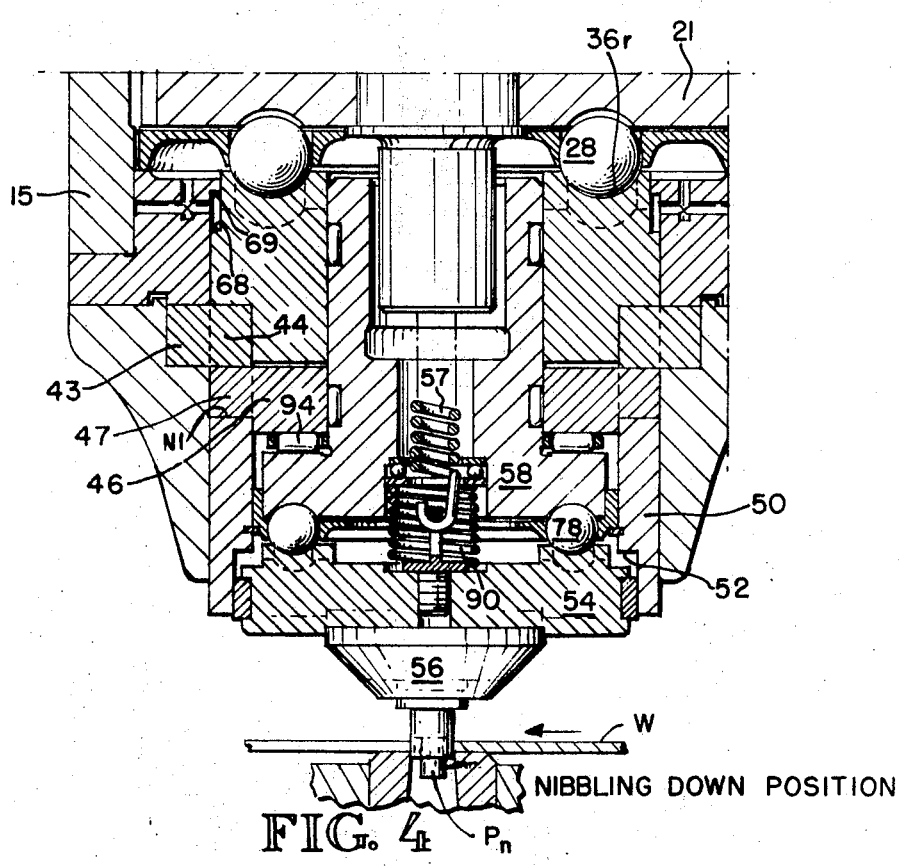
FIG. 4 NIBBLING DOWN POSITION

NIBBLING POSITION

NEUTRAL POSITION

STANDARD PUNCH POSITION

UNITIZED RAM DRIVE FOR A PUNCH PRESS

BACKGROUND OF THE INVENTION

1. Field of the Invention

This invention relates to punch presses and more specifically to drive mechanisms for reciprocating the ram in a punch press.

2. Description of the Prior Art

Heretofore drives for punch presses have relied on the use of a long drive shaft coupling a rotating fly wheel with the punching mechanism. In punch presses using a deep throat, such as in C-type frame machines, the torque imposed on this long drive shaft causes bearing and twisting problems.

In prior art machines an air clutch is conventionally employed for engaging the punching mechanism with the continuously rotating fly wheel. Such air clutches are generally undesirable because they are noisy in operation and require a supply of high pressure air in the factory.

Still another disadvantage of prior art drives for punch presses is that conventionally the drive shaft is connected to the ram by an eccentric which does not provide its maximum downward force until the eccentric is at the bottom of its stroke. Since the punch begins to cut through the workpiece prior to the eccentric being in the lowermost position, the maximum power of the punch is not realized until after the punch has passed through the workpiece. Thus, the maximum power of the punch is not utilized where it is most needed.

Still another disadvantage of prior art punch press drives is that they generally operate at only a single rate of reciprocation, whereas it is often desirable to be able to provide for a rapid stroke with a lower power requirement, a slower stroke with more power, or even to provide for a period of dwell between the strokes.

SUMMARY OF THE INVENTION

This invention pertains to a punch press drive having several unique features:

For example, it is an object of this invention to provide a unitized ram drive located directly adjacent the flywheel of the power supply.

It is another object of this invention to provide a drive for a punch press which converts the rotary motion of the power supply to reciprocation of the ram through the use of a plurality of thrust balls rolling over cam waves on a reciprocal member.

It is another object of this invention to provide a ram drive for a punch press which is quiet in operation and more efficiently converts rotary power to reciprocating movement.

This feature of the invention is obtained by a unitized drive located directly adjacent the flywheel of the power supply. The drive converts the rotary motion of the power supply to linear reciprocation of the ram by the use of thrust balls rolling between two spaced members. One of these members has a plurality of cam waves which when the balls are rolled thereover causes the other member to reciprocate. The two members are biased toward one another to maintain the engagement against the thrust balls and clutch means is provided to limit the movement towards one another to allow the balls to be disengaged so that rotation of the one member may continue without reciprocating the other member.

It is another object of this invention to provide a ram drive for a punch press which readily provides for an infinite variety of linear speeds for the downward stroke of the ram, or linear speeds for upward stroke of the ram, or dwell between strokes.

It is an object of this invention to provide a drive for a punch press which allows selection of the maximum punching force to be provided at any location along the stroke of the ram.

This feature is obtained by adjusting the slope of the forward surface of the cam waves to provide any desired rate of movement during the downward stroke of the ram at any location along the stroke so that maximum power can be obtained as the punch is initially contacting and cutting through the workpiece.

It is another object of this invention to provide a ram drive for a punch press which may be selectively shifted between a slow speed standard punching operation to a high speed nibbling operation.

This feature is obtained by providing double sets of balls and thrust converting members with the cam waves for one of the thrust converting members being more plentiful than on the other so that by a simple clutching mechanism, the rate of reciprocation can be alternated from standard or slow speed punching to nibbling or faster speed punching. Clutching in the preferred embodiment is obtained by the use of a powered shifting mechanism remotely controlled by the operator of the machine.

BRIEF DESCRIPTION OF THE DRAWINGS

FIG. 3 is a fragmentary vertical section taken along the line 3—3 of FIG. 2 and illustrating the ram drive in a neutral position.

FIG. 4 is a fragmentary vertical section of the ram drive taken along the line 4—4 and illustrating the ram drive in a nibbling down position.

DESCRIPTION OF THE PREFERRED EMBODIMENT

Figure 1:
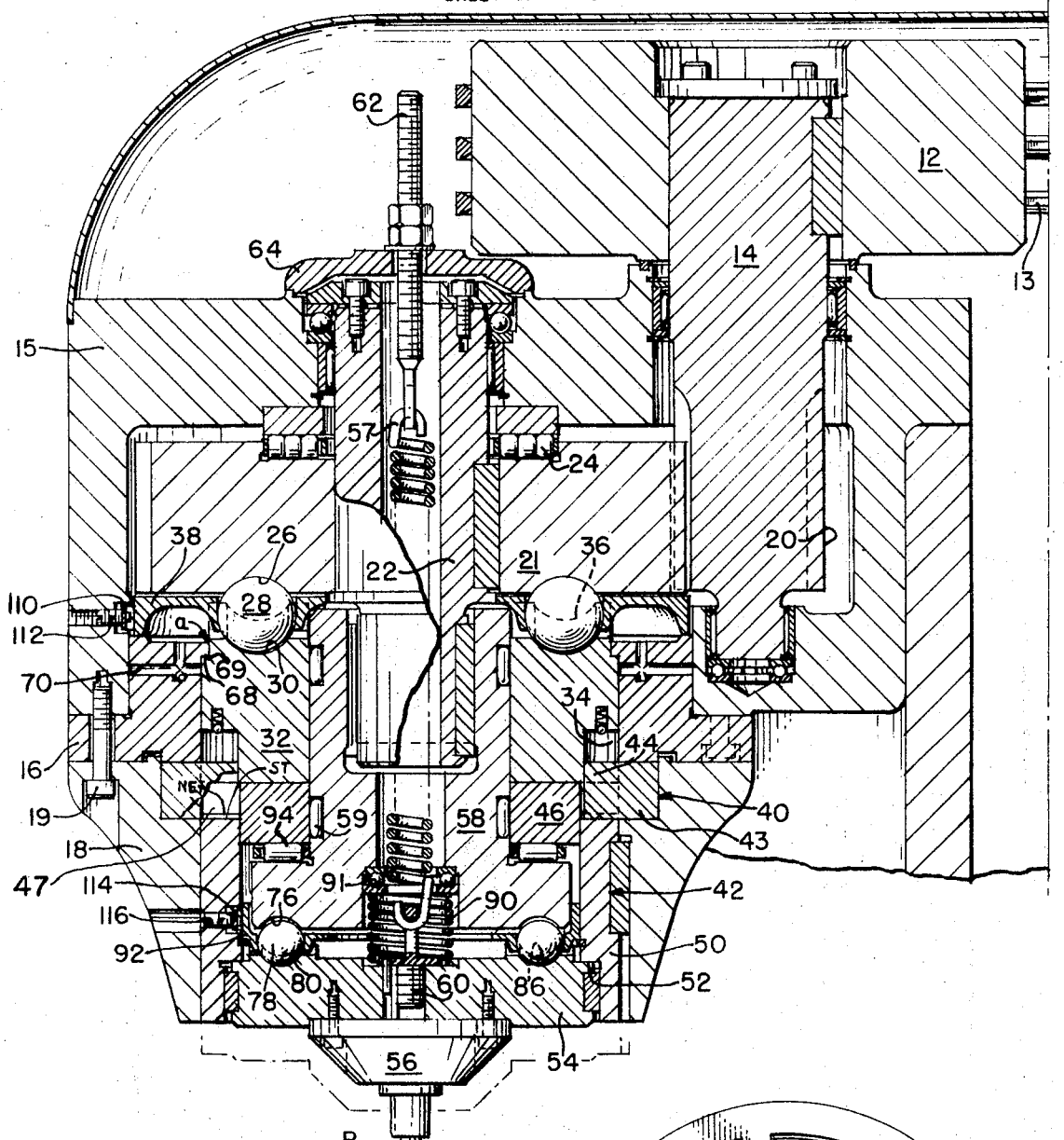
FIG. 1 is a fragmentary vertical section of a unitized ram drive embodying the principles of the invention shown in a standard punch up position but with a nibbling punch.
Figure 2:
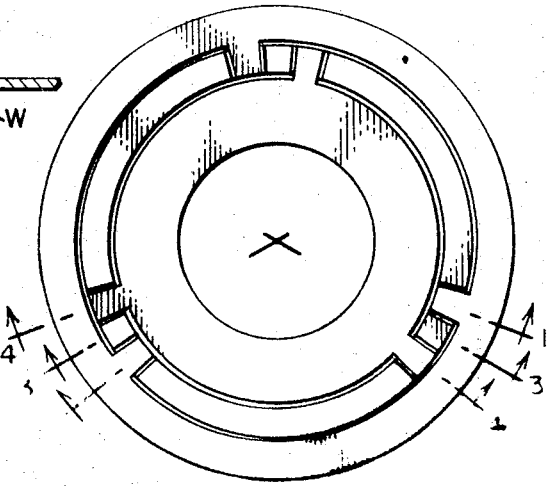
FIG. 2 is a schematic along a transverse section of the ram drive showing the positions of the sections for each of the three operational views of FIGS. 1, 3 and 4.
Figure 5:
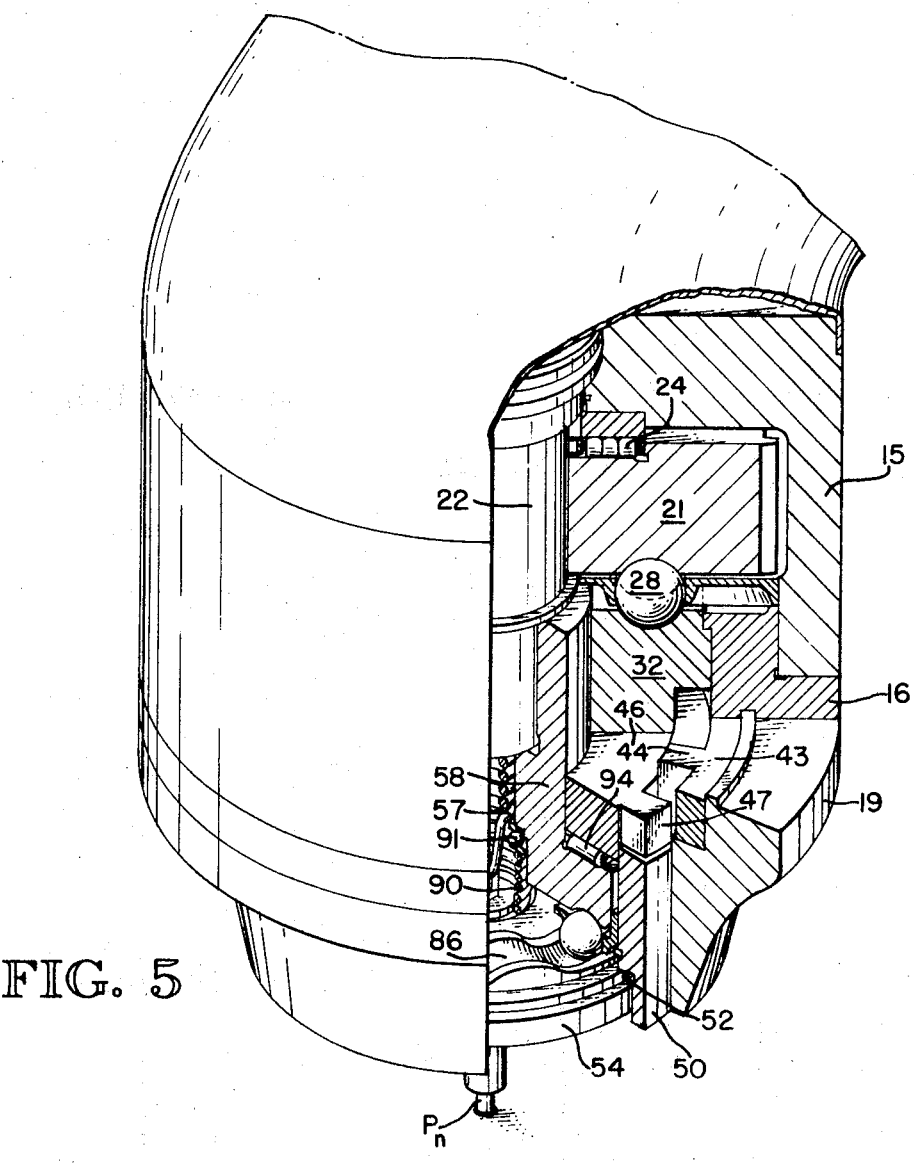
FIG. 5 is a fragmentary isometric of the unitized ram drive with parts broken away for clarity.

The unitized ram drive of this invention is adapted to be used as a substitute for the drive with any conventional punch press. In the preferred form of the embodiment an electric motor or other power source, not shown, is coupled to a flywheel 12 by a plurality of conventional v-belts 13. The flywheel is keyed to a flywheel drive shaft 14 that is rotatably mounted in a fixed rigid frame 15. As is well understood, the frame 15 is a part of the frame of the punch press and is sufficiently rigid to withstand the reaction force of the punch as it is driven through the workpiece W. Although not shown, it is understood that a suitable table is provided below the workpiece to hold a die in a conventional manner. The frame 15 also includes an adapter ring 16 and a ram housing 18 secured to the frame by cap screws 19.

The flywheel drive shaft 14 is provided with gear teeth 20 which mesh with a primary drive gear 21. In this regard, the designation primary and secondary and upper and lower will frequently be used interchangeably in the specification. Most punch presses operate with the punch moving in a vertical plane and passing through the workpiece from above. It should be understood, however, that the unitized drive of this invention is equally suitable for punching operations from below the workpiece and in some cases punching operations in the horizontal plane. The primary drive gear is keyed to a hollow primary drive shaft 22. Primary thrust bearings 24 between the frame and the primary drive gear allow suitable rotational movement of the primary drive gear but preclude upward movement thereof. The primary drive gear 21 is provided with an annular track 26 in its lower surface. Positioned for rolling movement in the track are a plurality of primary thrust balls 28, in the preferred embodiment three in number, although a minimum of two and more than three may also be used. The thrust balls also roll in a track 30 in a primary wave thrust ring 32. The thrust ring 32 is mounted for linear reciprocation on a plurality of pins 34 (FIG. 7) which are slidably received in a plurality of bores in the primary thrust ring 32.

Figure 8:
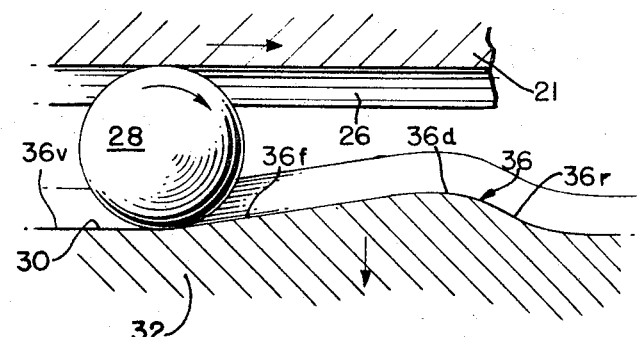
FIG. 8 is a schematic illustration showing the relative movement between the parts of the unitized ram drive and illustrating the slope changes for varying the speed of the stroke of the ram.

The track 30 is provided with a plurality of equidistantly spaced cam waves 36, each having a forward inclined slope 36f (FIG. 8) and a rearward inclined slope 36r. The top of the cam may be provided with a dwell surface of zero slope, such as at 36d. The balls are held in equidistantly spaced positions between the primary drive gear 21 and the primary thrust ring 32 by a primary thrust ball cage 38. As is readily apparent, when the balls 28 are in engagement with both the track 26 and the track 30, rotation of the primary drive gear 21 will cause the balls to begin rolling. The rate of revolutions of the balls about the axis of the shaft 22 will be one half the RPM of the primary drive gear. As the balls begin to move up the forward slopes 36f of the cam waves 36, the primary thrust ring 32 is moved downwardly. Once the balls 28 have passed over the high spot of the waves and are going down the rearward slope 36r, the primary thrust ring may be returned upwardly.

It should be apparent that the rate of downward movement of a punching stroke is determined by the inclination of the forward slope or surface 36f of the cam wave 36. This has tremendous significance in controlling the punching force delivered to the punch at any location along the downward stroke of the punch. For example, the inclination of the forward surface 36f is very gentle, thus maximizing the punching force throughout the entire downward stroke of the punch. Obviously the forward slope 36f could be of a steeper inclinantion to increase the punch speed, but with less force. If desired, the forward surface 36f could even be modified to provide a rapid downward movement by a steep inclination, then followed by a gentle inclination for maximum force as the punch enters the workpiece and followed by a flattened area on the surface 36d to provide a dwell. The inclination of the rear surface 36r is steep to return the ram quickly to its uppermost position. Obviously, the variations in the force versus stroke speed relationship may be varied infinitely as desired merely by modifying the shape of the cam waves 36. It should also be apparent that the use of balls rolling on smooth surfaces decreases the noise of the machine and eliminates rapid acceleration and decelerations which place undesirable loading on a machine and increase wear. This conversion of rotational movement to linear reciprocation by the use of the primary wave thrust ring, thrust balls and primary drive gear is an optimum arrangement for transferring rotational movement to linear reciprocation. Another advantage is that the inherent reduction of speed between the rpm of the balls and that of the primary drive gear 21 allows the use of a high speed lower mass flywheel, less expensive to manufacture and maintain than conventional flywheels.

As is readily apparent, substitution of the primary thrust ring with one having more or less cam waves provides a constant variation of the stroke frequency. Further variations of stroke frequency can also be obtained by varying the speed of the power source in a conventional manner.

The primary thrust ring 32 is coupled to the punch by a clutch mechanism 40 and a ram mechanism 42. The clutch mechanism will be described in more detail hereinbelow and briefly includes a clutch ring 43 having a plurality of radially directed internal dogs 44 and secondary or nibbling clutch plate 46 having a plurality of radially directed external dogs 47. The ram mechanism 42 includes a ram guide sleeve 50 keyed for reciprocation in the ram housing 18 and having a lower internal shoulder 52 in engagement with a secondary or nibbling wave thrust ring 54. Secured to the bottom of the nibbling wave thrust ring is a ram plate 56. The punch Pn is secured to the ram plate 56 in a conventional manner. Keyed to the primary drive shaft 22 for reciprocation therealong is a nibbling collar 58. Radial bearings 59 separate the nibbling drive collar 58 from the primary wave thrust ring 32 and the nibbling clutch plate 46 to allow rotation of the nibbling drive collar relative to the thrust ring and clutch plate. Bolts 34 secure the sleeve 50 to the ring 22.

Figure 10A:
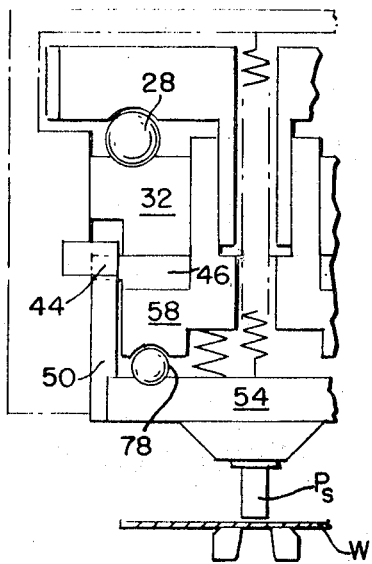
FIGS. 10A–10E are schematic illustrations showing the operations sequence for standar punching and for nibbling punching.
Figure 10B:
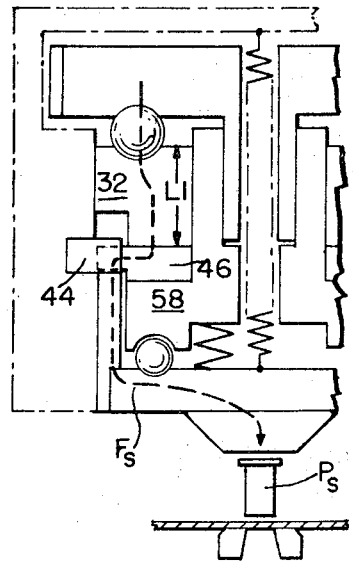
Figure 10C:
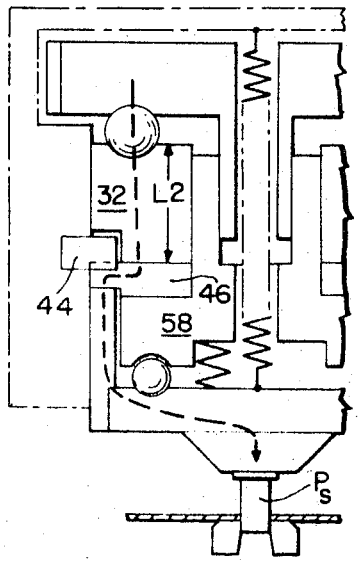

In FIGS. 10B and 10C the drive unit is set in a "standard position." As is readily apparent, downward movement of the punch due to the downward movement of the primary thrust ring 32 is accomplished, as shown by the arrows in FIGS. 10B and 10C, by transferring the movement through the nibbling clutch plate 46, thence through the ram guide sleeve 50, through the nibbling wave thrust ring 54, the ram plate 56 to the punch.

Return of the ram to its upper position is accomplished in the preferred embodiment by a primary ram return spring 57. The return spring is connected at its lower end to a bracket 60 threaded into a bore in the nibbling wave thrust ring 54. At its upper end the spring 57 is coupled to an adjustable bolt 62 which abuts against a spring retainer cap 64. As is apparent, adjustment of the nuts on the bolt 62 will determine the tension of the spring 58 and thus the return biasing force applied to retract the punch from the workpiece. The return spring also maintains an upward force on the primary thrust ring 32 through the nibbling wave thrust ring 54, the ram guide sleeve 50, and the nibbling clutch plate 46 to maintain friction contact between the balls 28, the primary drive gear 21 and primary wave thrust ring 32. The existence of such biasing force is necessary, of cource, to assure sufficient rolling friction to roll the thrust balls 28 over the cam waves 36.

Upward movemnet of the primary thrust ring 32 is decelerated to reduce impact. For this purpose, the primary thrust ring is provided with a shoulder 68 (FIG. 4) which confronts an opposite shoulder 69 on the adapter ring 16. As the primary thrust ring moves upwardly relative to the adapter ring 16, the shoulder 68 as it approaches the shoulder 69 traps air therebetween, thus cushioning the upward movement of the primary thrust ring. The air eventually leaks out in a gap between the surfaces of the adapter ring and the primary thrust rings as at "a." The cavity between the two shoulders 68 and 69 will be defined as a dampening cavity. The cavity is initially vented when the thrust ring is in its lowermost position through dampening cavity ports 70 (FIG. 1) to allow free movement of air into and out of the dampening cavity in all but the uppermost position of the primary thrust ring.

As thus far described, the ram is capable of reciprocating at the rate of speed determined by the number of balls and the corresponding number of cam waves. The reciprocation of the ram can be halted by use of the clutch mechanism 40. Although not necessary for a punching operation, a further desirable feature of the preferred form of the invention is that the unitary drive also embodies a nibbling or secondary punch operation with selection between the standard punch position, nibbling punch position or neutral position. It should be understood, however, that the unitque rolling-ball motion conversion feature of this invention has utility in punch presses having only a single speed operation as will be further described.

In the preferred form of the invention the punch Pn has a workpiece stop and a cutting edge for nibbling operations. As is well known, the nibbling punch is placed in a previously punched hole in the workpiece. Next the work is fed past the punch at a fast rate of speed and the punch reciprocated at a rapid rate, such as 600 hits per minute, allowing the nibbling edge of the punch to cut through the workpiece as it is advanced post the punch. Of course, in the device illustrated a second speed for the punching operation can be provided regardless of whether or not it is for nibbling. That is if desired a standard punch can be employed in the secondary speed position as in FIG. 4 since it may be desirable even in standard punching operations to have the choice between a first speed obtained by the standard punch operation and a slightly increased speed in a secondary punching operation.

Nibbling or the second speed is obtained in the preferred embodiment through the nibblind drive collar 58 and the nibbling wave thrust ring 54. The nibbling drive collar 58 has a secondary thrust ball track 76. A plurality of nibbling or secondary thrust balls 78 are adapted to ride in the track. The nibbling wave thrust ring 54 is provided with a seondary or nibbling cam track 80 having a plurality of secondary or nibbling cam waves 86. As in the primary cam wave 36, each cam wave 86 is provided with a slope inclination to provide a desired stroke rate for the punch. For a nibbling operation nine waves are provided to increase the reciprocation of the punch 600 hits per minute with a 6 millimeter stroke, for example. This is compared to the example of 200 hits per minute with a 30-ton punching force and a stroke of 20 millimeters for the primary punching operation.

A secondary or nibbling declutch compression spring 90 lifts the drive collar 58 off the balls 78 during the standard punch position and neutral position as shown in FIGS. 1 and 3, respectively. The spring is journaled by a nibbling declutch spring thrust bearing 91. The declutch spring has a spring force of approximately 100 lbs. as opposed to the primary ram retaining spring 58 which has a spring force of between 200 and 300 lbs. In the standard and neutral punch positions the shoulder 52 of the ram guide sleeve 50 abuts the nibbling wave thrust ring 54. When the nibbling wave thrust ring 54 is lowered relative to this shoulder as in FIG. 4, the tension of the primary ram return spring 57 overcomes the force of the declutch spring 90, allowing the nibbling wave thrust ring to move toward the nibbling drive collar to roll the nibbling thrust balls 78. A secondary or nibbling thrust ball cage 92 is provided to maintain the thrust balls 78 in equidistantly spaced positions. In the nibbling position shown in FIG. 4 the nibbling wave thrust ring is moved downwardly as the balls 78 ride over the cam waves 86. Reaction forces against the drive collar 58 are transferred to the frame 15 via a plurality of nibbling thrust bearings 94, nibbling clutch plate 46 external dogs 47, internal dogs 44, the rotatable primary clutch ring 43, and the frame adapter ring 16.

Figure 7:
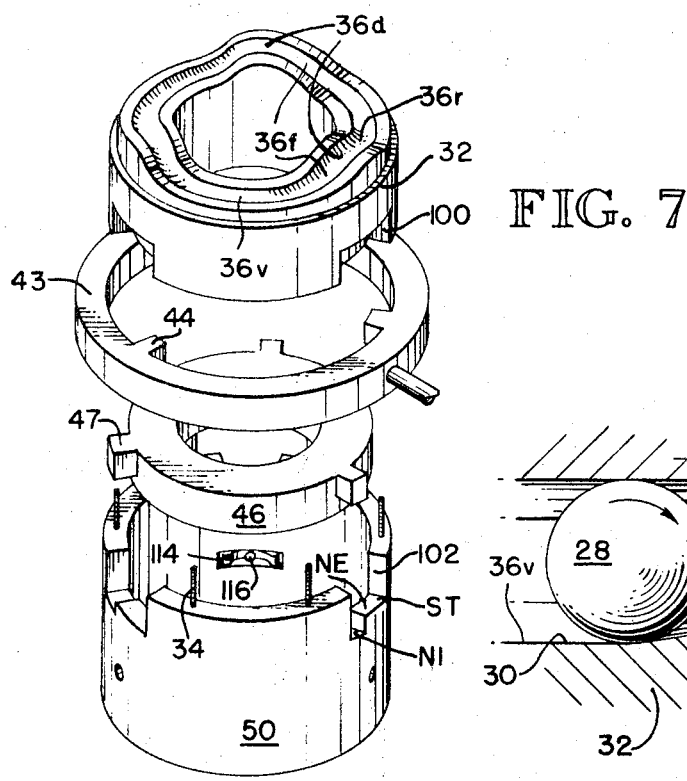
FIG. 7 is an exploded isometric of a portion of the unitized ram drive shown in FIG. 1.

The clutching mechanism 40 will now be described. As best shown in FIG. 7, the internal dogs 44 on the rotatable clutch ring 43 slide within slots 100 in the primary wave thrust ring 21. The internal dogs 44 also fit within notches 102 in the ram guide sleeve 50. The notches 102 have three notched steps identified as ST for standard, NE for neutral and NI for nibbling. The external dogs 47 on the nibbling clutch plate 46 also extend into the notches 102. As will be understood, the height of the step NE is a slight distance, in the preferred embodiment 1 millimeter, greater than the height of the step ST in the ram guide sleeve.

In the neutral position shown in FIG. 3, the clutch ring 43 is moved to the centermost position in the notch 102, such that the internal dog 44 rests on the step NE. Since the ring 43 abuts the adapter ring 16 and thus can not be moved upward, the guide sleeve is held down approximately 1 millimeter, the height of the step NE about the step ST. In this position the external dog 47 abuts the step NI and the primary wave thrust ring 32 rests on the nibbling clutch plate 46. However, the 1 millimeter downward movement of the guide sleeve precludes the primary wave thrust ring from moving fully upward to push the primary thrust balls 28 against the primary drive gear 21. In this position the primary drive gear continues to rotate but passes over the thrust balls 28 and thus cannot roll them to provide the downward movement of the primary wave thrust ring. Furthermore, the shoulder 52 of the rma guide sleeve 50 remains in engagement with the nibbling wave thrust ring 54 to preclude it from being raised any further. The nibbling declutch spring 90 meanwhile holds the nibbling drive collar 58 off the secondary thrust balls 78 so that no downward movement is experienced by the nibbling wave thrust ring 54. In this neutral position rotation of the primary drive gear may continue without reciprocation of the punch.

Since the thrust balls 28 and 78 may be rotating at the time the clutch mechanism is placed into the neutral position, it is desirable to bring the balls to rest as quickly as possible and preferably before they again rise onto the tops of the cam waves. This is accomplished with the primary thrust ball cage by a plurality of spring brakes 110 equidistantly spaced around the frame 15. A small set screw 112 is threaded into a bore in the frame so that the radially inward position of the spring brake may be set by adjusting the inward location of the set screws 112. The spring brakes remain in light contact engagement with the thrust ball cage 38 such that when the driving force is removed, by allowing the primary wave thrust ring to drop, the spring brakes 110 quickly bring the thrust ball cage to rest. In practice this distance should be less than the distance to the next successive forward incline of the next cam wave 36. In like manner a plurality of spring brakes 114 (FIG. 7) and corresponding set screws 116 are provided in the ram guide sleeve 50 at threee equidistantly spaced positions. These spring brakes engage the nibbling bearing cage 92 to bring it to rest when the balls 78 are de-energized.

Figure 9:
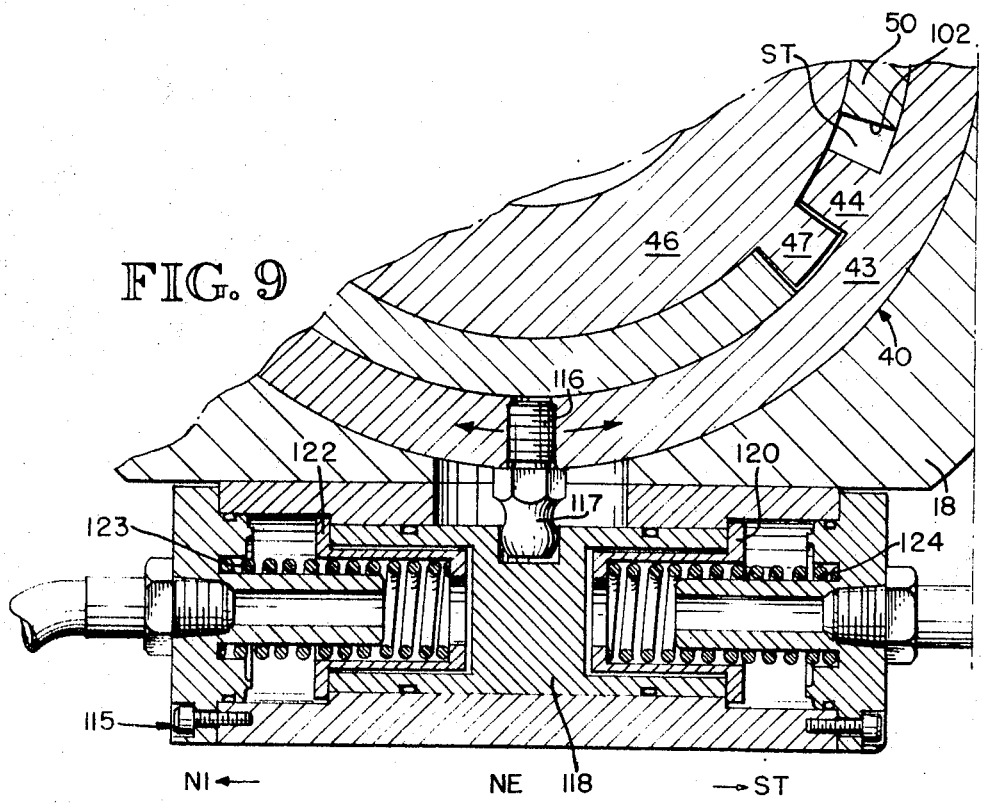
FIG. 9 is a fragmentary horizontal section illustrating operations of the clutching mechanism.

In the standard punch position as shown in FIG. 1, the nibbling thrust balls 78 must be de-energized while the primary thrust balls 28 are rolled. To accomplish this the clutch ring 43 is moved counterclockwise as viewed in FIG. 9 so that the internal dogs 44 rest on the step ST. In this position the ram guide sleeve is permitted to rise, pushing the thrust balls 28 into engagement with the rotating primary drive gear 21 to begin rolling the balls 28 over the cam waves 36. Thus, in this position reciprocation of the punch is obtained in the standard operating mode. As best shown also in FIG. 1, the nibbling wave thrust ring remains held by the shoulder 52 of the ram guide sleeve 50 to allow the nibbling drive collar to continue rotating without engaging the secondary thrust balls 78. In the standard punch position the downward thrust load and reaction load is transferred from frame 15, through primary thrust bearings 24, primary drive gear 21, thrust balls 28, primary wave thrust ring 32, nibbling clutch plate 46, external dogs 47, ram guide sleeve 50, shoulder 52, nibbling wave thrust ring 54, ram plate 56 and thence to the punch.

Finally in the nibbling position best shown in FIG. 4 the rotatable clutch ring 43 is rotated to its most clockwise position. In order to rotate the clutch ring 43 to this position the ram guide sleeve 50 must be moved downwardly by movement of the primary thrust balls 28 to the uppermost surfaces of the cam waves 36. In this position the nibbling clutch plate 46 is moved downwardly below the level of the rotatable clutch ring 43 so that the internal dogs 44 may be moved directly above the external dogs 47. In this position the combined height of the internal dogs 44 and the external dogs 47 is sufficient to allow the primary wave thrust ring to drop as in the neutral position shown in FIG. 3 resulting in lowering the primary thrust balls 28 from the primary drive gear 21 and thus de-energizing the thrust balls. The height of the nibbling clutch plate, however, is greater than that of its external dogs 47 so that the under side of the nibbling clutch plate engages the nibbling thrust bearings 94 and pushes the nibbling drive collar 58 downwardly to overcome the springs 90 and allows the return spring 58 to pull the nibbling wave thrust ring 54 upwardly moving the secondary thrust balls 78 into engagement with the rotating nibbling drive collar 58. This starts the rolling action of the nibbling thrust balls 78 to begin the higher speed or second speed reciprocating operation of the punch P. In the nibbling position the thrust and reaction forces are transmitted from the frame 15 by adapter ring 16, clutch ring 43, thrust bearings 94, drive collar 58, balls 78, nibbling wave thrust ring 54, ram plate 56 and thence to the punch P.

Figure 6C:
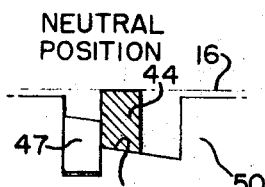
FIGS. 6A–6C illustrate positions of the clutching mechanism in the nibbling, neutral, and standard punching positions, respectively, and illustrating the sequence of steps to engage the drive in the nibbling position.
Figure 6A:
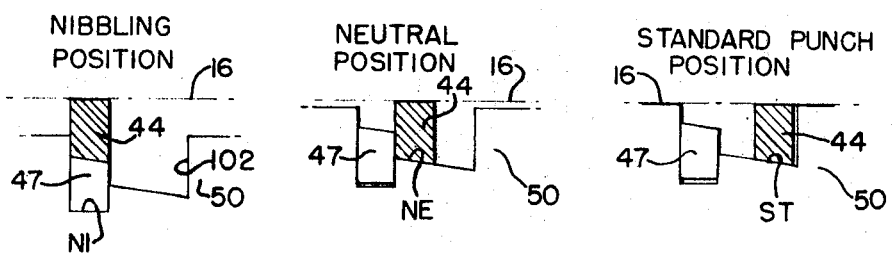
Figure 6B:
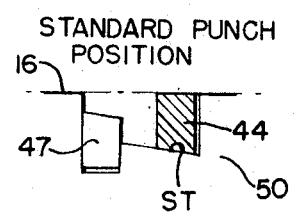

Rotation of the rotatable clutch ring 43 is accomplished from a remote location by an actuator mechanism 115. For this purpose, a short rod 116 is secured to the clutch ring. The rod 116 has a universal coupler 117 attached to its outer end. The coupler is mounted in a center spring-biased core 118 of a three-position pneumatic valve. The valve is of basically conventional structure, having right-hand cylinder and piston 120 and a left-hand cylinder and piston 122. Air into the right-hand cylinder moves a core 118 to the left against the resistance of a spring 123 to move the rotatable clutch ring into the nibbling position. Venting the cylinder on the right and pressurizing the cylinder 122 on the left moves the clutch ring to the right into the standard position. Venting both of the cylinders 120 and 122 allows the spring 123 and 124 to return the core to the center neutral position. These respective positions are shown in FIGS. 6A–6C. As best shown also in these figures, the tops of the external dogs 47 have a taper corresponding to an opposite taper on the bottoms of the internal dogs 44. Likewise the steps NE and ST are tapered to allow even engagement with the internal dogs 44. The taper allows engagement of the internal dogs 46 over the external dogs 47 even where timing is off slightly. These surfaces may be provided with some low friction material such as a "Teflon" to allow the actuating mechanism 115 to move the clutch ring into its desired position once it has started into that position.

It should be understood that the embodiment of the invention shown in FIGS. 1–9 can be used solely for one-speed operation, for two-speed operation, and particularly for two-speed operation in which the second speed is a nibbling operation. FIGS. 1, 3 and 4 and FIGS. 6A–6C illustrate the preferred technique for placing the drive into nibbling operation. Assuming a hole is first punched in the workpiece, as for example by using a standard punch in the punch press and operating the drive in the standard punch position, the nibbling punch Pn is then substituted for the standard punch and the drive operated in the following sequence: Starting from the neutral position (FIGS. 3 and 6A) the clutch ring 43 is rotated into the standard punch position (FIGS. 1 and 6B). The thrust balls 28 are engaged lowering the ram guide sleeve 50. As the ram guide sleeve begins to return the clutch ring 43 is rotated over the nibbling clutch plate 46 (FIGS. 4 and 6C) pushing it down to overcome springs 90 thus initiating the nibbling operation. Return of the clutch ring 43 to the neutral position will terminate the nibbling operation. Thus the steps are neutral to standard to nibbling. For one-speed operation the sequence could by neutral to standard to neutral for one stroke or neutral to standard for multiple strokes.

Figure 10D:
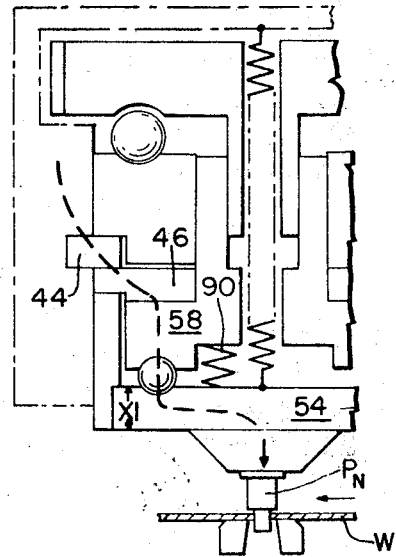
Figure 10E:
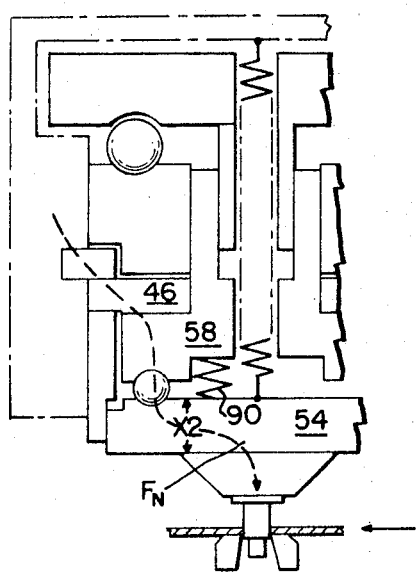

The sequences for standard punch operation are also shown schematically in FIGS. 10A–10C with the arrow Fs illustrating the path of the ram force from the fixed frame through the various components. Dimensions L1 and L2 represent the bottom and top of the cam wave of the primary wave thrust ring 32. In FIGS. 10D and 10E the nibbling or second speed operation is illustrated schematically with the arrow for indicating the path of the ram force. Dimensions $x1$ and $x2$ represent the bottom and top of the cam wave of the nibbling wave thrust ring 54.

Figure 11:
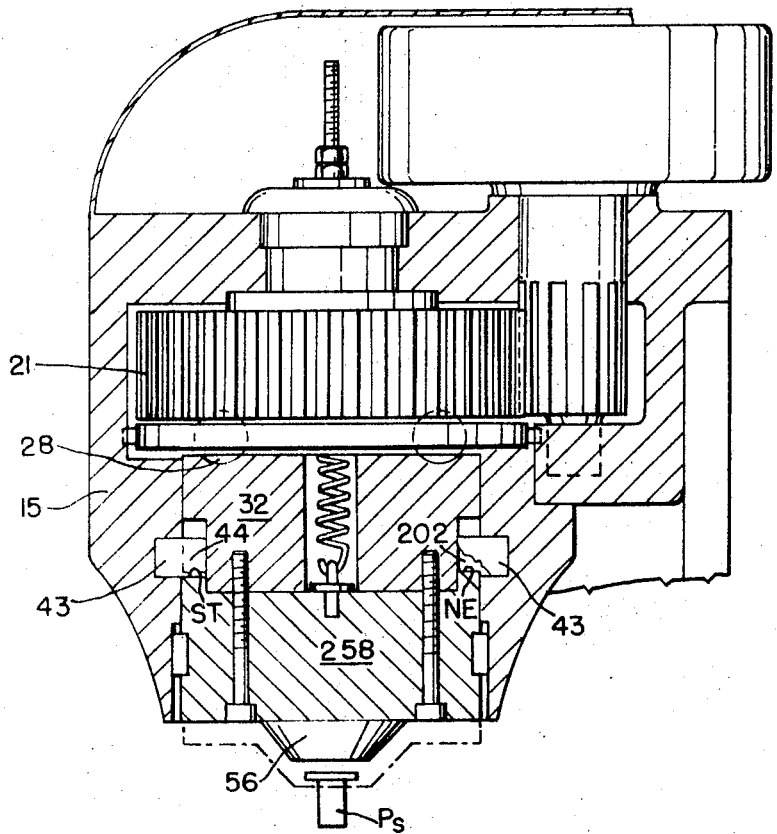
FIG. 11 is a fragmentary section illustrating a simplified preferred form of single speed ram drive embodying the principles fo the invention.

For clarity FIG. 11 illustrates a typical ram drive for single speed operation. In this embodiment the components may be simplified, as shown, and consist basically of the frame 15, primary drive gear 21, thrust balls 28 etc. The clutch ring 43 is basically identical with the previously described embodiments, however, since no nibbling operation would be used the nibbling clutch plate 46 is eliminated. In the embodiment of FIG. 11 the ram plate 56 is coupled to a unitary housing 258 which is engaged directly by the primary thrust ring 32. The housing includes a slot 202 having a neutral step NE and a lower standard punch position step ST. The internal dog on the clutch ring 43 is shown abutting the step ST so that the balls 28 are engaged. As described earlier, rotation of the clutch ring to engage the step NE holds the unitary housing downwardly releasing the balls 28 to stop further punching.

While the preferred form of the invention has been illustrated and described, it should be understood that it is capable of being modified by one skilled in the art without departing from the principles thereof. Accordingly, the description is not to be limited to the preferred form illustrated, but is to be limited only by a literal interpretation of the claims appended hereto.

The embodiments of the invention in which an exclusive property or privilege is claimed are defined as follows:

1. A unitized drive for a punch press comprising a rigid frame, primary wave thrust means mounted on said frame for linear movement and having an upper surface provided with upwardly projecting equidistantly spaced primary cam waves, at least two primary thrust balls positioned on said primary wave thrust means upper surface, primary means for rolling said thrust balls over said upper surface and for preventing upward movement of said thrust balls whereby said primary wave thrust means is moved downwardly each time the balls pass over the cam waves, ram means coupled to said primary biasing means for urging said ram means and primary wave thrust means upwardly, clutch means for disengaging said primary thrust balls from said primary ball rolling means when said clutch is in a neutral position and for engaging said primary thrust balls with said primary ball rolling means when in a standard position, and a punch for punching a hole in a workpiece with each downward stroke of said ram means.

2. The unitized drive of claim 1, including secondary thrust means having a secondary upper surface provided with a plurality of upwardly projecting equidistantly spaced secondary cam waves, at least two secondary thrust balls positioned on said secondary upper surface, secondary means for rolling said secondary thrust balls over said secondary upper surface and for preventing upward movement of said secondary thrust balls whereby said secondary wave thrust means is moved dowwardly each time the secondary balls pass over the secondary cam waves, secondary biasing means for urging said secondary ball rolling means away from said secondary thrust means, said clutch means including means for disengaging said primary thrust balls and for overcoming said secondary biasing means when said clutch means is in a secondary position to engage said secondary ball rolling means with said secondary thrust balls to move said secondary thrust means downwardly each time the secondary balls pass over a cam wave, and said secondary thrust means being coupled to said ram whereby the punch is moved downwardly with said secondary thrust means when said clutch means is in said secondary position for cutting the workpiece.

3. The unitized drive of claim 2, said secondary wave thrust means having substantially more wave cams than said primary wave thrust means for increasing the frequency of reciprocation of said secondary wave means to perform a nibbling action.

4. The unitized drive of claim 1 including dampening cavity means communicating with said primary thrust means for entrapping air and releasing it slowly as said primary thrust means moves upwardly to cushion the impact of the returning primary thrust means.

5. The unitized drive of claim 2, said ram means including a ram guide sleeve having a plurality of guide notches and a secondary clutch plate, said primary wave thrust means having a plurality of slots, said clutch means including a rotatable clutch ring having a plurality of radially inwardly extending internal dogs movable within the limits of said slots, when in a neutral position said internal dogs engageable with a guide notch of said ram guide sleeve and said clutch ring engageable with the underside of said frame means to limit upward movement of said ram guide sleeve.

6. The unitized drive of claim 5, said clutch means including a secondary clutch plate having radially outwardly extending external dogs that when in the secondary position are engageable with another of said notches in said ram guide sleeve and with the underside of said internal dogs of said clutch ring when the clutch ring top surface is engaged with said frame means to inactivate said primary thrust balls and activate said secondary thrust balls by allowing said force of said secondary biasing means to be overcome.

7. The unitized drive of claim 1, said primary cam waves having a shallow forward incline for providing increased power for punching.

8. The unitized drive of claim 7, said primary cam waves having a steep rearward incline for providing a rapid upward return stroke of said ram means.

9. A unitized drive for a punch press of the type having a rotary power source, comprising power conversion means coupled to said rotary power source for converting said rotary power into linear reciprocation, said power conversion means including an upper rotatable member, a lower recipro-cable member and a plurality of balls therebetween, means for biasing said upper and lower members toward one another for engagement with said balls to roll said balls over said lower member, and means for reciprocating said lower member as said balls are rolled over said lower member, a ram, means for coupling said ram to said lower member for reciprocating said ram, and clutch means limiting the movement of said upper and lower members toward one another for terminating said rolling of said balls.

10. The unitized drive of claim 9, said reciprocating means including a plurality of cam waves and wherein the rate of reciprocation can be varied by varying the shape of said cam waves.

11. The unitized drive of claim 9, said power conversion means including a nibbling rotatable upper member, a nibbling lower reciprocable member and a plurality of nibbling thrust balls therebetween, means for biasing said nibbling upper and lower members toward one another for engagement with said balls to roll said balls over said nibbling lower member, and means for reciprocating said lower member as said balls are rolled over said nibbling lower member, said nibbling lower member being coupled to said punch, and said clutch means including means limiting the movement of said nibbling upper and lower members toward one another for terminating said rolling of said nibbling thrust balls.

12. The unitized drive of claim 11, said nibbling reciprocating means including a plurality of cam waves.

* * * * *